United States Patent
Marsh et al.

(10) Patent No.: US 10,352,278 B2
(45) Date of Patent: Jul. 16, 2019

(54) METHOD AND SYSTEMS FOR AN EXHAUST GAS RECIRCULATION COOLER INCLUDING TWO SECTIONS

(71) Applicant: General Electric Company, Schenectady, NY (US)

(72) Inventors: Gregory Alan Marsh, Erie, PA (US); Suresh Rama Reddy Govindappa, Erie, PA (US); Venu Gummadavelli Gupta, Lisle, IL (US); Mahesh Chand Aggarwal, Erie, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 299 days.

(21) Appl. No.: 15/241,152

(22) Filed: Aug. 19, 2016

(65) Prior Publication Data
US 2018/0051660 A1    Feb. 22, 2018

(51) Int. Cl.
*F02M 26/28* (2016.01)
*F28D 7/16* (2006.01)
(Continued)

(52) U.S. Cl.
CPC ......... *F02M 26/28* (2016.02); *F02B 29/0475* (2013.01); *F02D 41/005* (2013.01);
(Continued)

(58) Field of Classification Search
CPC ........ F02M 26/28; F02M 26/32; F02M 26/24; F02M 26/25; F02M 26/12; F02M 26/30;
(Continued)

(56) References Cited

U.S. PATENT DOCUMENTS 1,814,010 A * 7/1931 Snow ................... F28D 7/0075
126/109
1,884,209 A * 10/1932 Potter .................. F28F 9/0241
165/70
(Continued)

FOREIGN PATENT DOCUMENTS

DE    10 2004 010 117 A1    11/2004
EP     0 930 429 A2     7/1999
(Continued)

OTHER PUBLICATIONS

Haresh: U.S. Appl. No. 15/077,287, filed Mar. 22, 2016.
(Continued)

*Primary Examiner* — Sizo B Vilakazi
*Assistant Examiner* — Brian R Kirby
(74) *Attorney, Agent, or Firm* — McCoy Russell LLP

(57) ABSTRACT

Various methods and systems are provided for an exhaust gas recirculation (EGR) EGR cooler for an engine system. In one example, the EGR cooler includes a first section with a first group of tubes adapted to flow exhaust gases, and also includes a first group of passages formed by exterior surfaces of the first group of tubes and adapted to flow coolant from a coolant source. The EGR cooler also includes a second section including a second group of tubes adapted to flow coolant from the coolant source, and a second group of passages formed by exterior surfaces of the second group of tubes and adapted to flow the exhaust gas from the first group of tubes.

20 Claims, 7 Drawing Sheets

(51) Int. Cl.
| | | |
|---|---|---|
| *F02D 41/00* | (2006.01) | |
| *F02M 26/24* | (2016.01) | |
| *F02M 26/25* | (2016.01) | |
| *F02M 26/30* | (2016.01) | |
| *F02M 26/32* | (2016.01) | |
| *F28D 7/00* | (2006.01) | |
| *F02M 35/10* | (2006.01) | |
| *F02B 29/04* | (2006.01) | |
| *F28D 21/00* | (2006.01) | |
| *F02M 26/12* | (2016.01) | |
| *F28F 27/02* | (2006.01) | |
| *F02M 26/19* | (2016.01) | |

(52) U.S. Cl.
CPC .......... *F02M 26/12* (2016.02); *F02M 26/24* (2016.02); *F02M 26/25* (2016.02); *F02M 26/30* (2016.02); *F02M 26/32* (2016.02); *F02M 35/10209* (2013.01); *F28D 7/0075* (2013.01); *F28D 7/16* (2013.01); *F28D 7/1623* (2013.01); *F28D 21/0003* (2013.01); *F28F 27/02* (2013.01); *F02M 26/19* (2016.02); *F28F 2250/06* (2013.01); *F28F 2280/02* (2013.01); *Y02T 10/146* (2013.01)

(58) Field of Classification Search
CPC .............. F02M 35/10209; F02M 26/19; F02D 41/005; F28D 7/0075; F28D 21/0003; F28D 7/1615; F28D 7/1646; F28D 7/163; F28D 9/0093; F28D 7/1638; F02B 29/0475; F28F 2280/02
USPC .................................... 123/568.12
See application file for complete search history.

(56) References Cited

U.S. PATENT DOCUMENTS

| | | | | |
|---|---|---|---|---|
| 3,020,024 | A | | 2/1962 | Lawrance |
| 3,958,630 | A | | 5/1976 | Smith |
| 4,156,457 | A | * | 5/1979 | Murray ............... B01D 53/14 165/143 |
| 4,773,475 | A | * | 9/1988 | Sleep, Jr. ............ F28F 9/0219 165/158 |
| 5,357,936 | A | * | 10/1994 | Hitomi ............... F02B 29/0418 123/568.12 |
| 5,617,726 | A | * | 4/1997 | Sheridan ............. F02B 37/007 123/568.12 |
| 6,311,678 | B1 | * | 11/2001 | Lepoutre ............... F28D 7/16 123/184.61 |
| 6,360,532 | B2 | * | 3/2002 | Strahle ............... F28D 9/0037 123/568.12 |
| 6,374,598 | B1 | * | 4/2002 | Neuschwander ....... F28D 7/106 165/154 |
| 6,755,158 | B2 | * | 6/2004 | Knecht ............... F02B 29/0412 123/41.01 |
| 6,976,480 | B2 | * | 12/2005 | Miyoshi ................ F02M 26/57 123/568.12 |
| 7,055,586 | B2 | * | 6/2006 | Sakakibara ........... F28D 7/1684 138/38 |
| 7,380,544 | B2 | * | 6/2008 | Raduenz ............... F28D 9/0056 123/568.12 |
| 8,069,905 | B2 | * | 12/2011 | Goto .................... F28D 7/1615 165/145 |
| 8,528,629 | B2 | * | 9/2013 | Kalbacher ........... F02B 29/0412 165/140 |
| 8,844,504 | B2 | * | 9/2014 | Raduenz ............... F28D 7/1684 123/568.12 |
| 8,978,629 | B2 | * | 3/2015 | Lohbreyer ............ F28D 7/1623 123/568.12 |
| 8,978,740 | B2 | * | 3/2015 | Schatz ................. F28D 7/1684 165/69 |
| 9,157,397 | B2 | * | 10/2015 | Zhang ........................ F28F 9/02 |
| 9,528,777 | B2 | * | 12/2016 | Vanderwees ............ F28F 27/00 |
| 2003/0150434 | A1 | * | 8/2003 | Leedham ............... F02M 26/26 123/568.12 |
| 2005/0188965 | A1 | * | 9/2005 | Usui .................... F28D 15/0266 123/568.12 |
| 2006/0278377 | A1 | * | 12/2006 | Martins ............... F02B 29/0412 165/140 |
| 2007/0186536 | A1 | * | 8/2007 | Hashizume ............. F01N 3/023 60/278 |
| 2008/0264609 | A1 | * | 10/2008 | Lutz .................... F28D 7/0091 165/104.19 |
| 2009/0277429 | A1 | | 11/2009 | Marsh et al. |
| 2009/0314483 | A1 | * | 12/2009 | Kalbacher ........... F02B 29/0412 165/185 |
| 2012/0174567 | A1 | * | 7/2012 | Limbeck ................ F01N 5/025 60/320 |
| 2014/0299115 | A1 | * | 10/2014 | Zhang ...................... F28F 9/02 123/568.12 |
| 2014/0318513 | A1 | * | 10/2014 | Kovac ................. F02B 29/0475 123/568.12 |
| 2015/0059716 | A1 | * | 3/2015 | Na ......................... F02M 26/32 123/568.12 |
| 2015/0107566 | A1 | | 4/2015 | Sugiyama et al. |
| 2016/0146162 | A1 | * | 5/2016 | Janke .................... F28D 7/0075 123/568.12 |
| 2016/0208744 | A1 | | 7/2016 | Bailey et al. |

FOREIGN PATENT DOCUMENTS

| | | | | |
|---|---|---|---|---|
| JP | H10176611 A | * | 6/1998 | .......... F28D 7/1684 |
| JP | 11280564 A | * | 10/1999 | .......... F28D 7/0091 |
| JP | 11280564 A | * | 10/1999 | .......... F28D 7/0091 |
| JP | 2005331217 A | * | 12/2005 | .......... F28D 7/1623 |
| JP | 2006057473 A | * | 3/2006 | .......... F28D 7/1623 |
| JP | 2006132470 A | * | 5/2006 | |
| JP | 2006132470 A | * | 5/2006 | |
| WO | 2007/098854 A1 | | 9/2007 | |
| WO | WO-2008105576 A1 | * | 9/2008 | .......... F28D 7/1684 |
| WO | 2012/108796 A1 | | 8/2012 | |
| WO | 2014/183001 A2 | | 11/2014 | |
| WO | WO2014/183001 A2 | * | 11/2014 | |

OTHER PUBLICATIONS

Extended European Search Report and Opinion issued in connection with corresponding EP Application No. 17186632.0 dated Nov. 17, 2017.

* cited by examiner

METHOD AND SYSTEMS FOR AN EXHAUST GAS RECIRCULATION COOLER INCLUDING TWO SECTIONS

BACKGROUND

Technical Field

Embodiments of the subject matter disclosed herein relate to an exhaust gas recirculation cooler of an exhaust gas recirculation system.

Discussion of Art

Engines may utilize recirculation of exhaust gas from an engine exhaust system to an engine intake system, a process referred to as exhaust gas recirculation (EGR). In some examples, a group of one or more cylinders may have an exhaust manifold that is coupled to an intake passage of the engine such that the group of cylinders is dedicated, at least under some conditions, to generating exhaust gas for EGR. Such cylinders may be referred to as "donor cylinders." In other systems, the exhaust gas may be pulled from a manifold.

Some EGR systems may include an EGR cooler to reduce a temperature of the recirculated exhaust gas before it enters the intake passage. The exhaust gas recirculation (EGR) cooler may be used to reduce exhaust gas temperature from about 1000 degrees Fahrenheit to about 200 degrees Fahrenheit. Some EGR coolers may have a configuration where coolant (e.g., water) is inside cooling tubes of the cooler and gas is outside the cooling tubes, with gas side fins for increased heat transfer. While these EGR coolers may have increased efficiency, they may also fail during use due to high thermal stress concentration in the cooling tubes at a connection point between the cooling tubes and a tube sheet of the EGR cooler. Stress concentrations on the tubes may be greatest at a leading edge of the EGR cooler, the edge that is closest to an exhaust inlet of the EGR cooler, due to increased thermal gradients at this location. Additionally, during idle, the EGR cooler may foul from oil carry-over from the engine in the EGR gas flow.

BRIEF DESCRIPTION

In one embodiment, an exhaust gas recirculation (EGR) cooler includes a first section including a first plurality of tubes adapted to flow at least some exhaust gas and a first plurality of passages formed by exterior surfaces of the first plurality of tubes and adapted to flow coolant from a coolant source. The EGR cooler additionally includes a second section including a second plurality of tubes adapted to flow coolant from the coolant source and a second plurality of passages formed by exterior surfaces of the second plurality of tubes and adapted to flow the exhaust gas from the first plurality of tubes.

DETAILED DESCRIPTION

The following description relates to embodiments of an exhaust gas recirculation (EGR) cooler including a first section and a second section. The first section may include a first plurality of tubes adapted to flow at least some exhaust gas, and a first plurality of passages formed by exterior surfaces of the first plurality of tubes and adapted to flow coolant from a coolant source. The second section may include a second plurality of tubes adapted to flow coolant from the coolant source, and a second plurality of passages formed by exterior surfaces of the second plurality of tubes and adapted to flow the exhaust gas from the first plurality of tubes.

Figure 1:
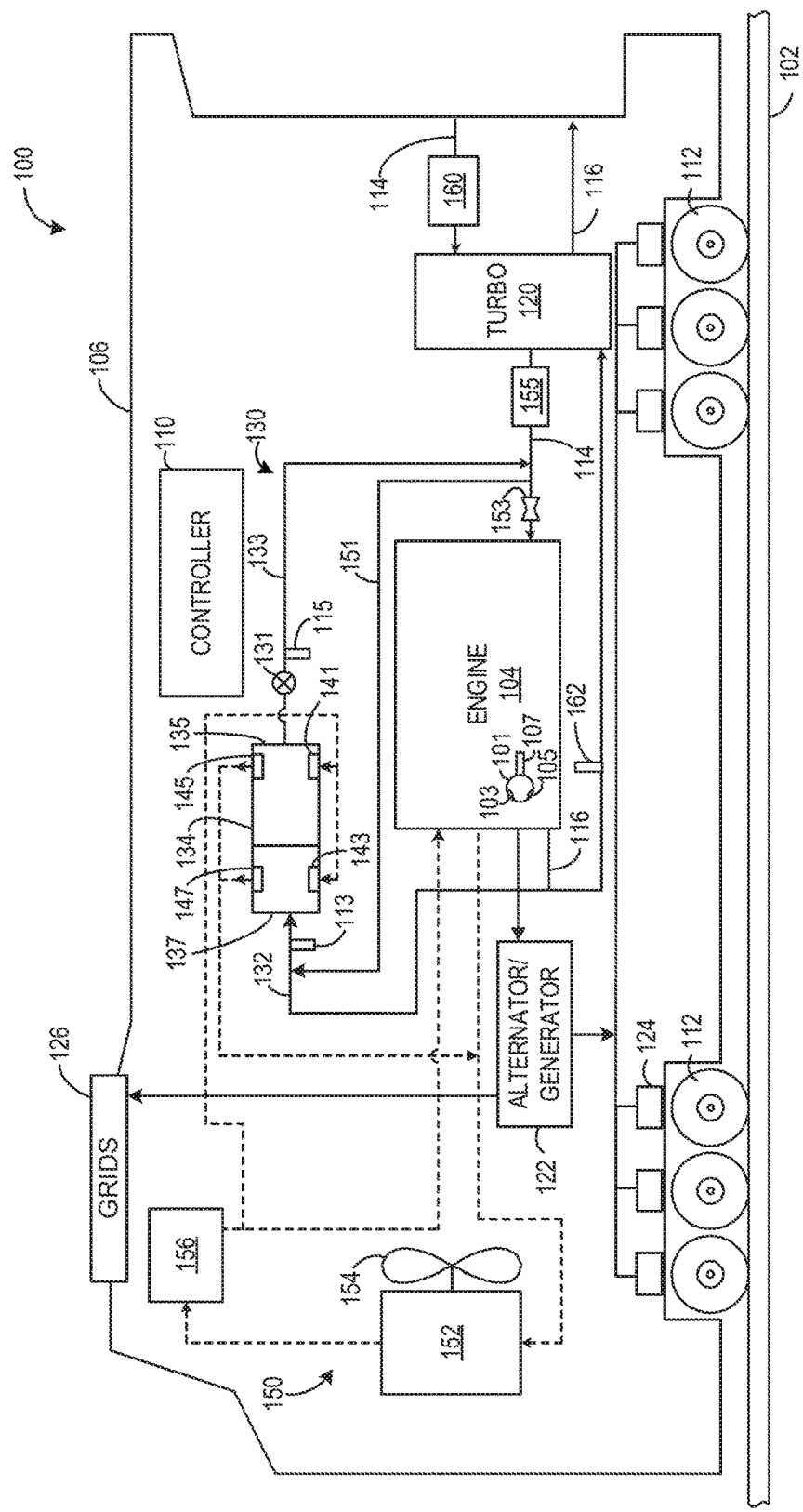
FIG. 1 shows a schematic diagram of an engine system including an exhaust gas recirculation (EGR) system including an EGR cooler, according to an embodiment of the invention.
Figure 2:
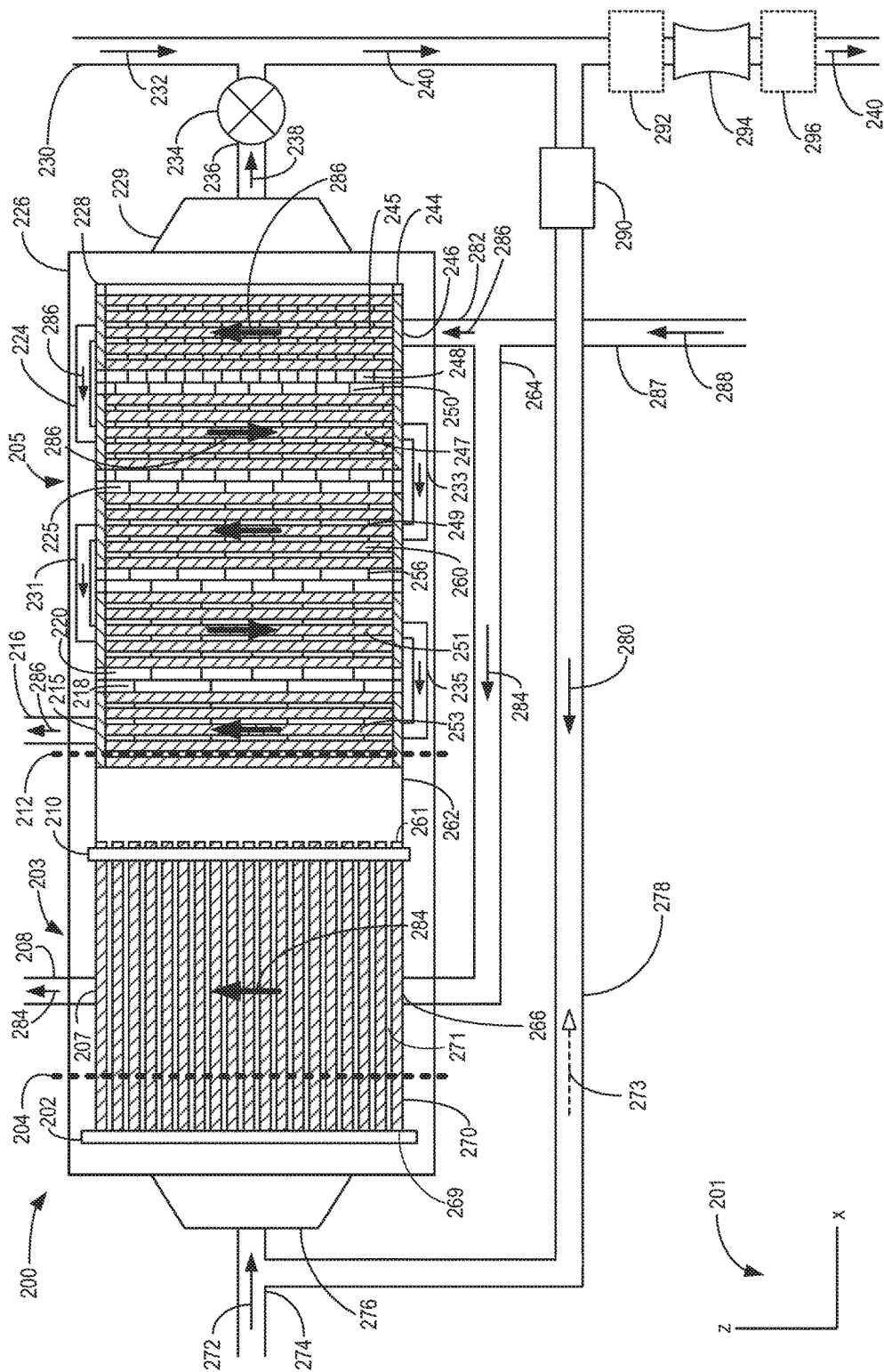
FIG. 2 shows a schematic diagram of an exhaust gas recirculation (EGR) cooler for an EGR system including relative positioning of sections of the EGR cooler, according to an embodiment of the invention.
Figure 3:
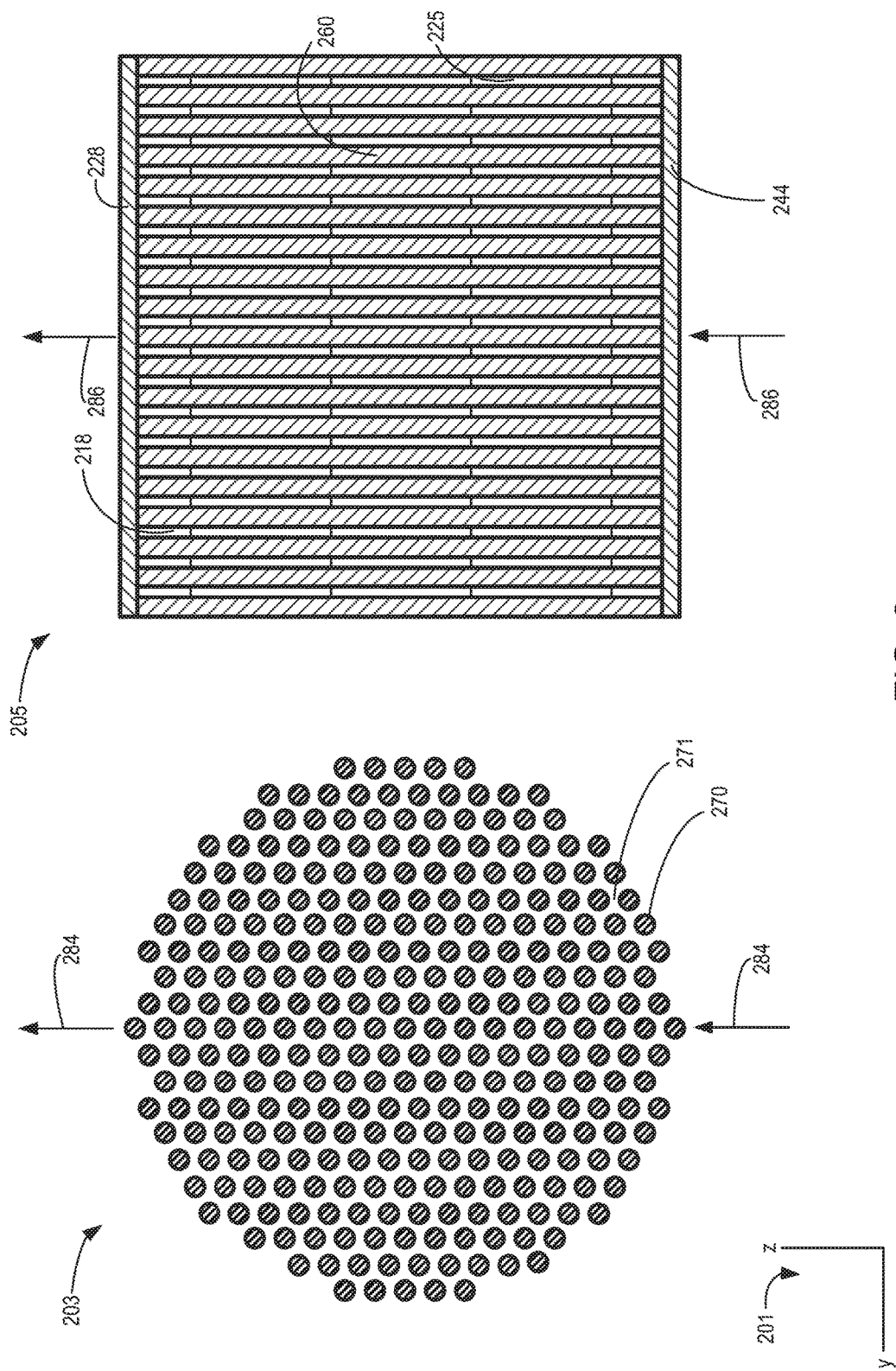
FIG. 3 shows a cross-sectional view of a first section and a second section of the EGR cooler of FIG. 2, according to an embodiment of the invention.
Figure 4:
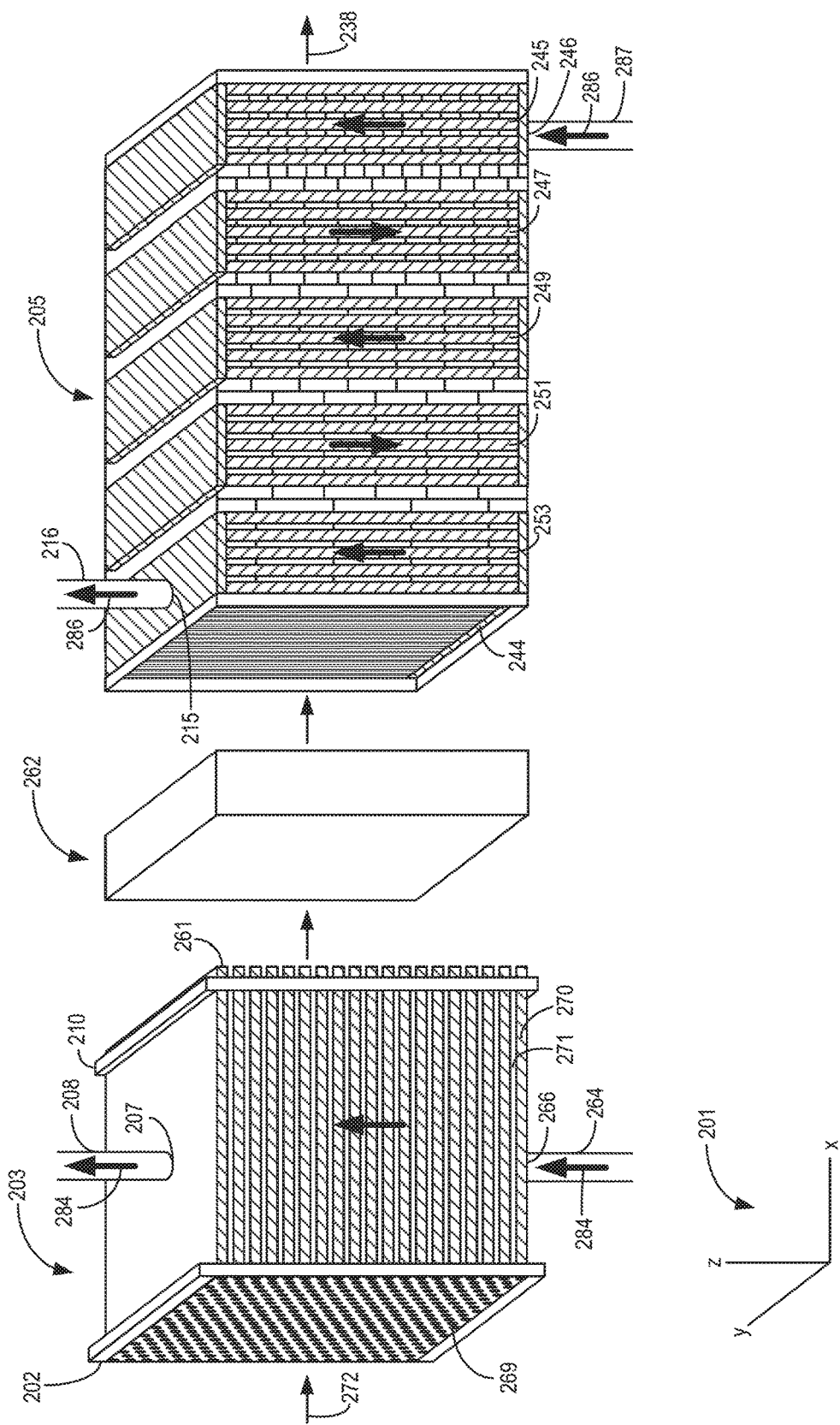
FIG. 4 shows an exploded view of the EGR cooler of FIG. 2, according to an embodiment of the invention.
Figure 5:
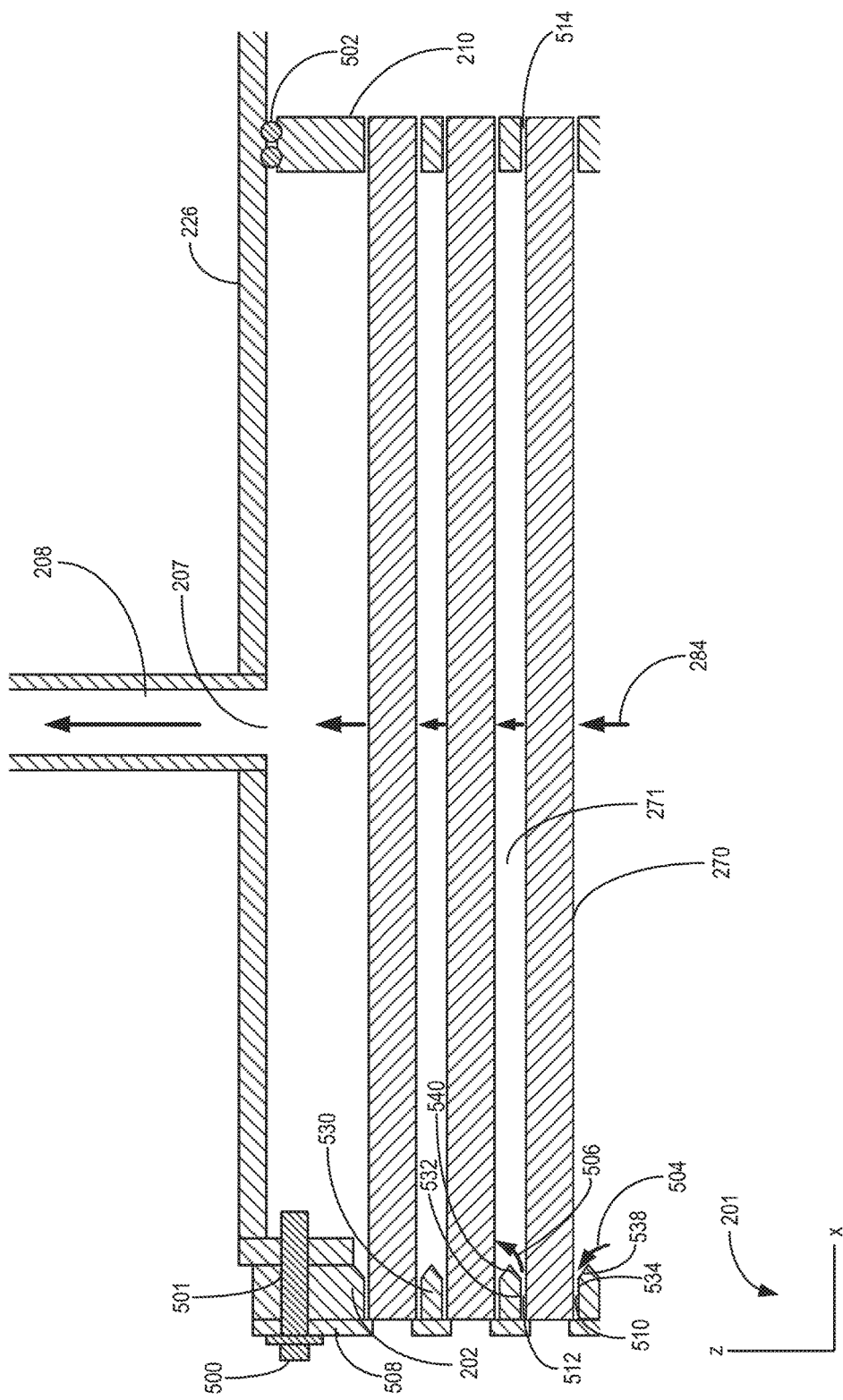
FIG. 5 shows an internal view of a portion of the first section of the EGR cooler of FIG. 2, according to an embodiment of the invention.
Figure 6:
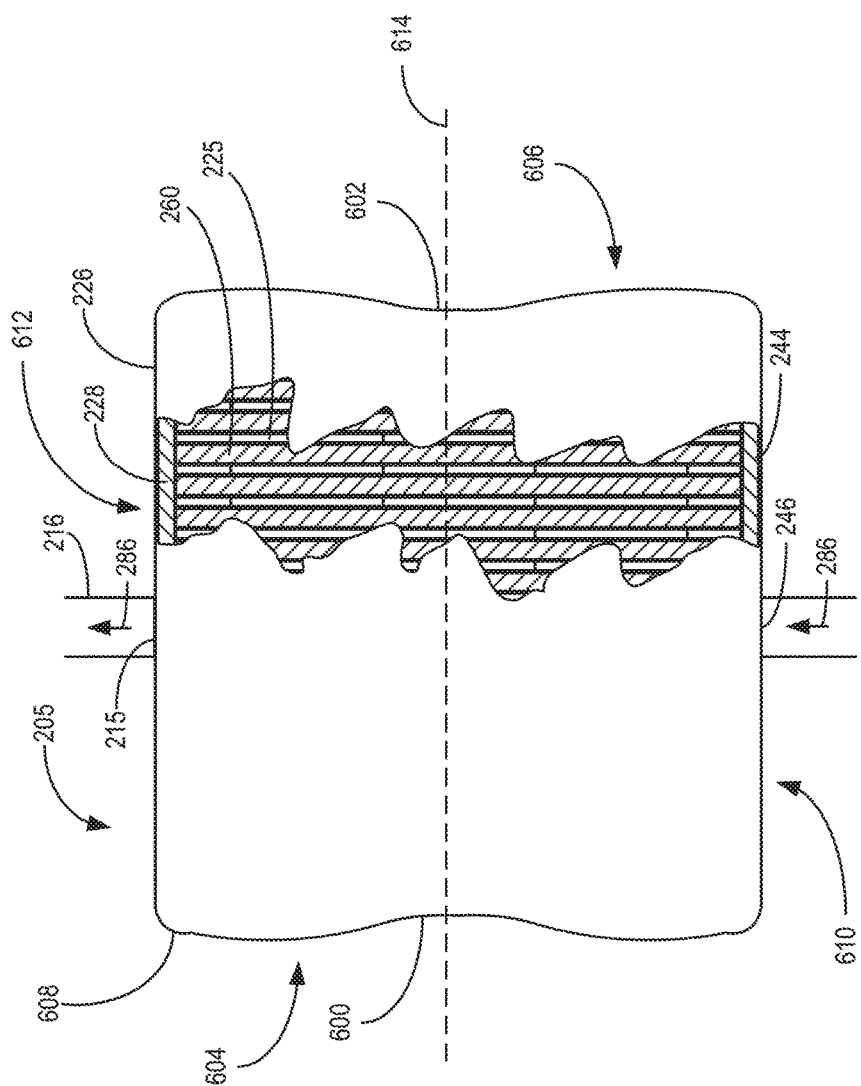
FIG. 6 shows a view of an EGR cooler for an EGR system with a portion of a second section of the EGR cooler exposed, according to an embodiment of the invention.
Figure 7:
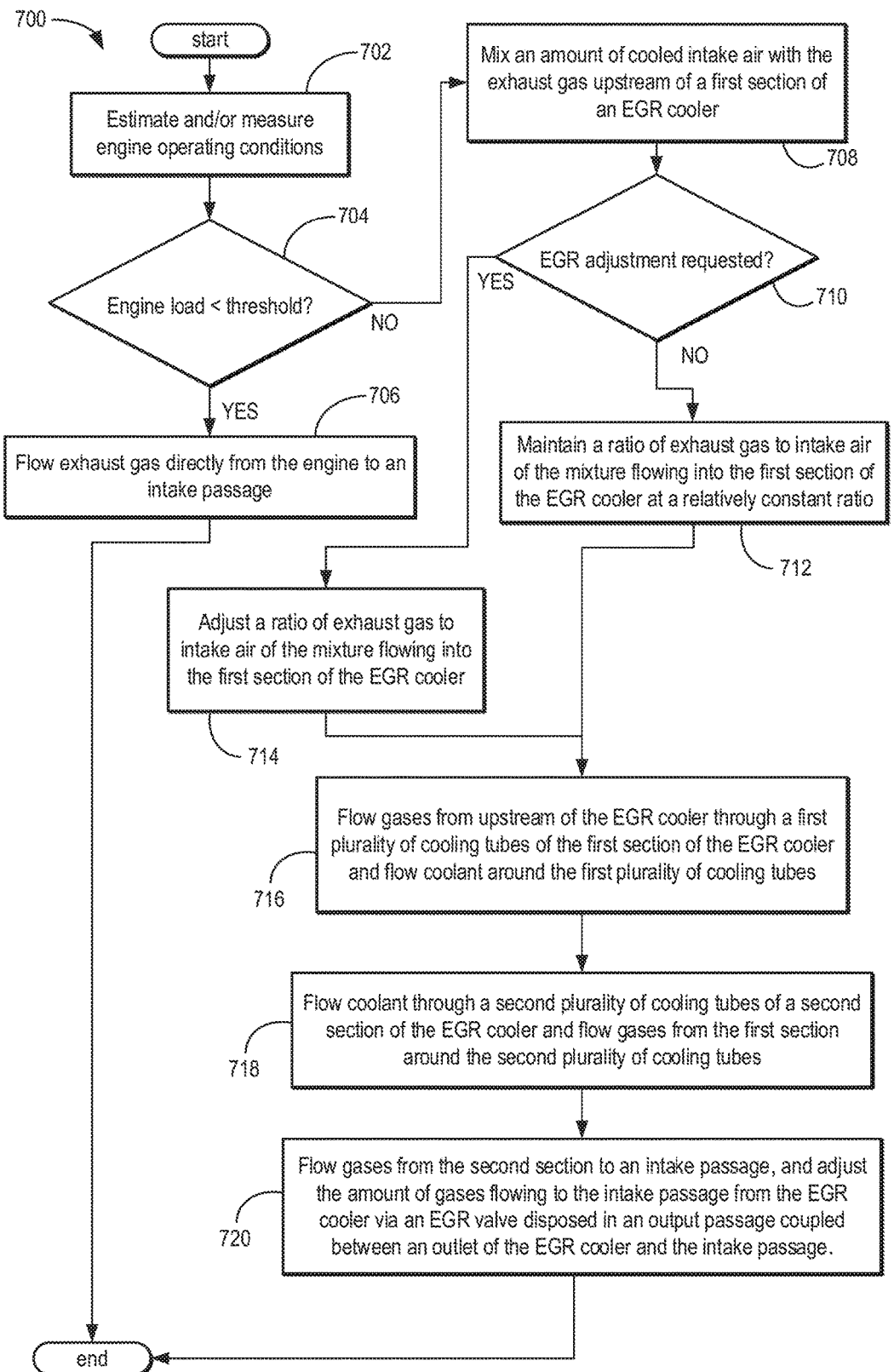
FIG. 7 shows a flow chart illustrating a method for flowing exhaust gas through an EGR cooler for an EGR system, according to an embodiment of the invention.

An engine system (e.g., vehicle system), such as the engine system shown by FIG. 1, may include an exhaust gas recirculation (EGR) system. The EGR system may include an EGR cooler configured to cool exhaust gases from an engine of the engine system. The EGR cooler is coupled to a coolant source within the engine system, such as a radiator. In one example, coolant (e.g., water) from the coolant source flows into a first section and a second section of the EGR cooler at a first side of the EGR cooler, and flows out of the first section and second section of the EGR cooler at a second side of the EGR cooler. The first section includes a first plurality of tubes (e.g., first tube group) arranged parallel to a first direction, and the second section includes a second plurality of tubes (e.g., second tube group) arranged perpendicular to the first direction and parallel to a second direction, as shown by FIG. 2. Coolant flows from the coolant source, into the first section, and around an exterior of tubes of the first tube group. Coolant also flows from the coolant source, into the second section, and through an interior of tubes of the second tube group. Meanwhile, exhaust gas flows from the engine and through an interior of the first tube group, and then flows into a transition section between the first section and second section. The transition section couples the first section to the second section, as shown by FIG. 2 and FIG. 4. The exhaust gas then flows from the transition section into the second section, around an exterior of the second tube group, and out of the EGR cooler towards an intake passage of the EGR system. An amount of intake air may mix with the exhaust gas via a bypass passage coupled between an inlet of the EGR cooler and the intake passage of the EGR system, as also shown by FIG. 2. The first tube group is coupled to a first tube sheet and a second tube sheet. The first tube group, first tube sheet, and second tube sheet may have a circular cross-section (as shown by FIG. 3) or rectangular cross-section (as shown by FIG. 2 and FIG. 4). The second tube group is coupled to a third tube sheet and a fourth tube sheet, and may have a rectangular cross-section. The first tube sheet is fixed into position by a housing of the EGR cooler, while the second tube sheet is a floating tube sheet that is separated from the housing of the EGR cooler by a gasket, as shown by FIG. 5. The housing of the EGR cooler may have a rectangular profile (e.g., may be shaped as a rectangular parallelepiped) with a first indentation along a first surface and a second indentation along a second surface, as shown by FIG. 6. An example of exhaust gas, intake air, and coolant flow through the EGR cooler is shown by FIG. 7.

In this way, exhaust gas may flow from the engine, mix with an amount of intake air from the intake passage, and enter the first tube group. The exhaust/intake air mixture within the first tube group is cooled by coolant flowing around the first tube group, and then flows into the transition section. The exhaust/intake air mixture flows from the transition section and around outer surfaces of the second tube group, while coolant flowing through the interior of tubes of the second tube group further cools the exhaust/intake air mixture. An amount of the cooled gas mixture then travels through an output passage coupled to the EGR cooler and is released into the intake air passage via a valve coupled between the output passage and the intake air passage. As a result of the configuration of the EGR cooler as described above, during operation of the EGR cooler, thermal stresses on the tube sheets and tube groups of the EGR cooler may be reduced, thereby increasing a durability of the EGR cooler. Further, since air from the intake system may mix with the exhaust gas from the engine via the bypass passage, a temperature of the exhaust/intake air mixture entering the EGR cooler may be reduced, also increasing the durability of the EGR cooler. During conditions in which engine speed is low (e.g., during engine idling), exhaust gas may bypass the EGR cooler via the bypass passage, thereby reducing a likelihood of EGR cooler fouling due to an amount of engine oil contained within the exhaust gas. Thus, the above-described configuration of a dual-sectioned EGR cooler may increase durability and reduce degradation of the EGR cooler.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for an EGR cooler including a first section with a first plurality of tubes and a second section with a second plurality of tubes, an embodiment of an engine system is presented. Specifically, FIG. 1 shows a schematic depiction of an embodiment of a vehicle system 100 (e.g., engine system) in which an EGR cooler may be installed. The vehicle system is herein depicted as a rail vehicle 106 (e.g., locomotive), configured to run on a rail 102 via a plurality of wheels 112. As depicted, the rail vehicle includes an engine 104. The engine includes a plurality of cylinders 101 (only one representative cylinder shown in FIG. 1) that each include at least one intake valve 103, exhaust valve 105, and fuel injector 107. Each intake valve, exhaust valve, and fuel injector may include an actuator that is actuatable via a signal from a controller 110 of the engine. In other non-limiting embodiments, the engine may be a stationary engine, such as in a power-plant application, or an engine in a marine vessel or other off-highway vehicle propulsion system as noted above. Further, in some embodiments, the plurality of cylinders may include a first group of donor cylinders and a second group of non-donor cylinders, where the donor cylinders supply exhaust to an exhaust gas recirculation (EGR) passage routing exhaust back to the intake of the engine, as explained further below.

The engine receives intake air for combustion from an intake passage 114. The intake passage receives ambient air from an air filter 160 that filters air from outside of the rail vehicle. Exhaust gas resulting from combustion in the engine is supplied to an exhaust passage 116. Exhaust gas flows through the exhaust passage, and out of an exhaust stack of the rail vehicle. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally combust fuel including gasoline, kerosene, natural gas, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 122 and electric traction motors 124. For example, the engine is a diesel and/or natural gas engine that generates a torque output that is transmitted to the alternator/generator which is mechanically coupled to the engine. In one embodiment herein, the engine is a multi-fuel engine operating with diesel fuel and natural gas, but in other examples the engine may use various combinations of fuels other than diesel and natural gas.

The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of the plurality of wheels to provide tractive power to propel the rail vehicle. One example configuration includes one traction motor per wheel set. As depicted herein, six traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by alternator/generator.

In some embodiments, the vehicle system may include a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Additionally or alternatively, in some embodiments, a supercharger may be present to compress the intake air via a compressor driven by a motor or the engine, for example. Further, in some embodiments, a charge air cooler 155 (e.g., water-based intercooler) may be present between the compressor of the turbocharger or supercharger and intake manifold of the engine. The charge air cooler may cool the compressed air to further increase the density of the charge air.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems.

The vehicle system may further include an exhaust gas recirculation (EGR) system 130 coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system). As depicted in FIG. 1, the EGR system includes an input passage 132 (e.g., an engine exhaust gas passage) coupled to an EGR cooler 134 to reduce a temperature of the exhaust gas before it enters the intake passage. By introducing exhaust gas to the engine, the amount of available oxygen for combustion is decreased, thereby reducing the combustion flame temperatures and reducing the formation of nitrogen oxides (e.g., NOR). Additionally, the EGR system may include one or more sensors for measuring temperature and pressure of the exhaust gas flowing into and out of the EGR cooler. For example, there may be a temperature and/or pressure sensor 113 positioned upstream of the EGR cooler (e.g., at an exhaust inlet of the EGR cooler, shown by FIG. 2) and a temperature and/or pressure sensor 115 positioned downstream of the EGR cooler (e.g., at an exhaust outlet of the EGR cooler). In this way, the controller may measure a temperature and pressure at both the exhaust inlet and outlet of the EGR cooler.

The EGR system further includes an EGR valve 131 for controlling an amount of exhaust gas that is circulated through the EGR cooler. The EGR valve may be an on/off valve controlled by the controller, or it may control a variable amount of EGR, for example. As shown in the non-limiting example embodiment of FIG. 1, the EGR system is a high-pressure EGR system. In other embodiments, the vehicle system may additionally include a low-pressure EGR system, routing EGR from downstream of the turbine to upstream of the compressor.

As depicted in FIG. 1, the vehicle system further includes a cooling system 150 (e.g., engine cooling system). The cooling system circulates coolant (e.g., cooling fluid such as water) through the engine to absorb waste engine heat and distribute the heated coolant to a heat exchanger, such as a radiator 152 (e.g., radiator heat exchanger). In one example, the coolant may be water. A fan 154 may be coupled to the radiator in order to maintain an airflow through the radiator when the vehicle is moving slowly or stopped while the engine is running. In some examples, fan speed may be controlled by the controller. Coolant which is cooled by the radiator may enter a tank (not shown). The coolant may then be pumped by a water, or coolant, pump 156 back to the engine or to another component of the vehicle system, such as the EGR cooler and/or charge air cooler.

As shown in FIG. 1, a coolant/water passage from the pump splits in order to pump coolant (e.g., water) to both the EGR cooler and engine in parallel. In one example, as shown in FIG. 1, the pump may pump coolant (or cooling water) into a first coolant inlet 143 arranged at a bottom (relative to a surface on which the engine system, or vehicle, sits) of a first section 137 of the EGR cooler. The pump may additionally pump coolant into a second coolant inlet 141 arranged at a bottom of a second section 135 of the EGR cooler. Coolant flows around a first plurality of cooling tubes (as shown in FIGS. 2-5, described in greater detail below) positioned within the first section of the EGR cooler, and coolant also flows within and through a second plurality of cooling tubes (as shown by FIGS. 2-4 and FIG. 6) within the second section of the EGR cooler. The second section of the EGR cooler is arranged downstream (e.g., relative to a direction of gases flowing through the EGR cooler) of the first section within a housing (shown by FIG. 2 and FIGS. 5-6) of the EGR cooler, and the first section and the second section are separated from each other within the housing (as shown by FIG. 2 and described below).

Coolant may exit the first section of the EGR cooler (e.g., exit a space surrounding the first plurality of cooling tubes) via a first coolant outlet 147 arranged at a top of the first section of the EGR cooler (the top opposite the bottom of the EGR cooler), and coolant may exit the second section of the EGR cooler (e.g., exit the second plurality of tubes) via a second coolant outlet 145 arranged at a top of the second section of the EGR cooler (the top opposite to the bottom of the EGR cooler). Thus, the EGR cooler may be filled with water (or coolant) from the bottom of the EGR cooler to the top via driving force from the pump. In some embodiments, the pump may then be arranged at a bottom of the EGR cooler. In this way, the EGR cooler may be filled with water or coolant through the bottom, thereby pushing air through and out the top of the EGR cooler. Thus, coolant may fill and flow through the cooling tubes in a direction opposite that of gravity. Further, there may be one or more additional sensors coupled to the coolant inlet and coolant exit of the EGR cooler for measuring a temperature of the coolant entering and exiting the EGR cooler. In an alternate embodiment, the coolant inlets and outlets may be reversed so that coolant enters the EGR cooler and the top of the EGR cooler.

Exhaust gas enters the EGR cooler via the input passage and exits the EGR cooler via an output passage 133 coupled to a gas outlet (shown by FIG. 2) of the EGR cooler. The output passage is coupled to the intake passage and flows output gases (e.g., cooled engine exhaust gas) from the EGR cooler to the intake passage. The EGR valve (described above) may be fully opened or fully closed (or moved into a plurality of positions between fully opened and fully closed) in order to adjust an amount of output gases exiting the EGR cooler.

An orifice 153 is coupled to the intake passage between the turbocharger and the engine (e.g., the intake manifold of the engine). In one example, the orifice may be a fixed orifice (e.g., with a non-adjustable amount of opening) configured to flow a first amount of mixed intake air and output gases from the EGR cooler to the engine and a second amount of mixed intake air and output gases from the EGR back to the EGR cooler. In another example, the orifice may have an adjustable opening (e.g., adjustable by the controller) to adjust the first amount of mixed intake air and output gases directed towards the engine from the intake passage and the second amount of mixed intake air and output gasses directed back to the EGR cooler. For example, the controller may adjust the opening of the orifice to a position between fully open and fully closed in order to direct a first portion of output gases and intake air to the engine, and to direct a second portion of output gases and intake air to a bypass passage 151 coupled to the intake passage.

The bypass passage is coupled between the intake passage and the exhaust inlet of the EGR cooler. The bypass passage, in combination with the EGR valve and orifice, may flow intake air and output gases (e.g., cooled exhaust gases exiting the EGR cooler) in a direction toward the exhaust inlet of the EGR cooler. In one example, the EGR valve may be partially or fully closed (e.g., actuated by the controller) while the orifice is partially or fully opened. In this configuration, exhaust gases flowing through the input passage are directed away from the EGR cooler and through the bypass passage toward the engine (e.g., toward the intake passage of the engine). For example, during a period in which engine torque demand below a threshold torque demand (e.g., during idling), exhaust gas from the engine may be at a relatively lower temperature than during a period in which engine torque demand is high. As a result, the controller may close the EGR valve in order to decrease an amount of cooling of the exhaust gases (e.g., by flowing the exhaust gases directly to the intake passage and not through the EGR cooler). The reduced flow of exhaust gases through the EGR cooler during low engine torque demand may also reduce an amount of fouling of the EGR cooler. Fouling may include contamination and/or degradation of the EGR cooler by engine oil due to engine oil present within the exhaust gases. In another example (e.g., during a period in which engine torque demand is above the threshold torque demand), the EGR valve may be opened (e.g., actuated by the controller) and the orifice may be partially closed (e.g., from a fully open position) in order to direct an amount of intake air from the intake passage into the bypass passage and towards the exhaust inlet of the EGR cooler. The intake air may mix with exhaust gas flowing through the input passage in order to reduce a temperature of the exhaust gas before it enters the EGR cooler. In other words, the cooler intake air may mix with the hotter exhaust gases to reduce a temperature of the gases entering the EGR cooler (from the higher temperature of the exhaust gases alone), and the exhaust gas/intake air mixture may then flow through the EGR cooler to be further cooled. As used herein, the exhaust gas/intake air mixture flowing through the EGR cooler may include at least a portion of exhaust gases from the engine and at least a portion of cooled intake air (e.g., cooled via a charge air cooler) pulled from an intake passage, upstream of the engine. This cooled intake air may include a portion of fresh intake air cooled via a charge air cooler and a portion of cooled EGR from the EGR cooler. Examples of exhaust gas, intake air, and coolant flows through the EGR cooler and within passages coupled to the EGR cooler are described in further detail below with reference to FIG. 7.

The rail vehicle further includes the controller (e.g., engine controller) to control various components related to the rail vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the locomotive (such as tractive motor load, blower speed, or the like). The first controller may be configured to control various actuators based on output received from the second controller and/or the second controller may be configured to control various actuators based on output received from the first controller. For example, the second controller may determine a first control signal to send to the pump in response to a second control signal sent from the first controller to the second controller, such as a pulse width of the second control signal being determined based on a determination of engine speed. The engine speed may be based on a measured engine speed (e.g., from an engine speed sensor), or determined based on operating conditions such as exhaust gas temperature, coolant temperature, etc. The second controller may determine the pulse width of the first control signal through a determination that directly takes into account a determined engine speed, such as increasing the pulse width of the first control signal with increasing engine speed. The second controller may alternatively determine the pulse width of the first control signal based on a calculation using a look-up table with the input being relative engine speed and the output being pulse-width.

The controller may receive information from a plurality of sensors and may send control signals to a plurality of actuators. The controller, while overseeing control and management of the engine and/or rail vehicle, may be configured to receive signals from a variety of engine sensors, as further elaborated herein, in order to determine operating parameters and operating conditions, and correspondingly adjust various engine actuators to control operation of the engine and/or rail vehicle. For example, the engine controller may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, gas temperature in the EGR cooler, or the like. The controller may also receive a signal of an amount of water in the exhaust from an exhaust oxygen sensor 162. Additional sensors, such as coolant temperature sensors, may be positioned in the cooling system. Correspondingly, the controller may control the engine and/or the rail vehicle by sending commands to various components such as the traction motors, the alternator/generator, fuel injectors, valves, or the like. For example, the controller may control the operation of a restrictive element (e.g., such as a valve) in the engine cooling system. Other actuators may be coupled to various locations in the rail vehicle.

FIGS. 2-6 each include reference axes 201 for comparison of the views shown by FIGS. 2-6. For example, FIG. 2 and FIGS. 4-6 each show a same embodiment of an EGR cooler from different views. FIG. 3 shows an embodiment of the EGR cooler from FIG. 2 with the first section of the EGR cooler arranged in a cylindrical shape (e.g., with a circular cross-section). However, other components shown by FIGS. 2-6 may be similar and are labeled similarly. Components that are labeled similarly may be introduced once and not re-introduced.

FIG. 2 shows an embodiment of an EGR cooler 200 (such as the EGR cooler 134 described above and shown by FIG. 1) included within an engine system (such as the engine system described above). The EGR cooler includes an exhaust inlet 276 fluidly coupled to both an input passage 274 (e.g., an engine exhaust passage configured to flow exhaust gas from the engine) and an intake passage 230 (e.g., an engine intake air passage). The exhaust inlet is fluidly coupled to the intake passage by a bypass passage 278, with the bypass passage coupled between the input passage and the intake passage. The bypass passage is coupled to the input passage at a position upstream (e.g., relative to a flow of exhaust gas through the input passage) of the exhaust inlet of the EGR cooler.

The intake passage includes an orifice 294 (similar to the orifice 153 shown by FIG. 1) positioned downstream of a location where the intake passage is coupled to the bypass passage (e.g., positioned downstream relative to a direction of intake air flowing towards the engine). In one example, as described above with reference to the orifice shown by FIG. 1, the orifice may be a non-adjustable opening. In another example, the orifice may be an actively adjustable orifice, with an amount of opening of the orifice adjustable via a controller (such as the controller 110 described above with reference to FIG. 1). The controller may include memory (e.g., non-transitory computer readable storage media) containing instructions stored thereon for adjusting the amount of opening of the orifice based on one or more engine operating conditions. In one example, the controller adjusts an amount of opening of the orifice based on a temperature of exhaust gases within the input passage. For example, the controller may determine a control signal to send to an actuator of the orifice, such as an amplitude of the signal being determined based on a determination of the exhaust temperature. The exhaust temperature may be based on a measured exhaust temperature (e.g., via a sensor coupled to the input passage), or determined based on operating conditions such as engine speed. The controller may determine the signal amplitude through a determination that directly takes into account a determined exhaust temperature, such as increasing the amplitude with increasing exhaust temperature. The controller may alternatively determine the signal amplitude based on a calculation using a look-up table with the input being exhaust temperature and the output being signal amplitude. As another example, the controller may make a logical determination (e.g., regarding a position of the orifice) based on logic rules that are a function of exhaust temperature. The controller may then generate a control signal that is sent to an actuator of the orifice (e.g., a solenoid, or the like.).

The EGR cooler includes a gas outlet 229 coupled to an output passage 236, and the output passage is coupled to the intake passage. Gases entering the EGR cooler via the exhaust inlet travel through the EGR cooler and exit via the gas outlet. An amount of gas flowing into exhaust inlet of the EGR cooler and out of the gas outlet is adjustable via an EGR valve 234 (similar to the EGR valve 131 described above with reference to FIG. 1) disposed within the outlet passage. For example, the controller may move the EGR valve (via an actuator, such as a solenoid, or the like) into a fully open position to increase a flow of gases through the EGR cooler, the controller may move the EGR valve into a fully closed position to decrease (e.g., block) the flow of gases through the EGR cooler, or the controller may move the EGR valve into a plurality of positions between fully open and fully closed to increase or decrease the flow of gases through the EGR cooler.

The EGR cooler includes a first section 203, a second section 205, and a transition section 262. The first section and the second section may both be removably coupled to a housing 226 of the EGR cooler. In one example, the first section may be decoupled and removed from the EGR cooler so that the first section (and the components contained within, as described below) may be more easily maintained, cleaned, swapped out, or the like. When engine torque demand is low (e.g., during idling of the engine), engine oil may travel through the input passage and deposit onto the first section and the components contained within the first section. By decoupling and removing the first section from the EGR cooler during maintenance, engine oil buildup can be more easily removed.

The first section includes a first plurality of tubes (e.g., first tube group 270) fluidly coupled to the exhaust inlet and adapted to flow at least some exhaust gas from the exhaust inlet to the transition section of the EGR cooler. In one example, an exhaust/intake air mixture flows through the exhaust inlet (e.g., via a bypass passage, as described below), and the first tube group directs the exhaust/intake air mixture towards the transition section. A first end 269 of each tube within the first tube group is rolled into a first tube sheet 202. The first tube sheet is fastened (described in detail below with reference to FIG. 5) to the housing of the EGR cooler such that the first tube sheet is unable to move (e.g., rotate, translate, or the like) during operation of the EGR cooler. A second end 261 of each of the first plurality of tubes are rolled into a second tube sheet 210. The second tube sheet is a floating tube sheet and is not fastened (e.g., secured) to the housing of the EGR cooler as shown by FIG. 5 and described further below.

The first section includes a first plurality of passages (e.g., first passage group 271) formed by exterior surfaces of the first tube group (e.g., formed in the spaces between adjacent tubes of the first tube group). The first passage group is fluidly coupled to a coolant source (e.g., such as the cooling system 150 shown by FIG. 1) and is adapted to flow coolant through the first section and around the first tube group. For example, a first coolant flow 288 may travel from the coolant source through a first coolant passage 287 in a direction toward the EGR cooler. The first coolant passage may then split into a second coolant passage 264 and a third coolant passage 282, with the second coolant passage coupled to a first coolant inlet 266 of the first section of the EGR cooler. A second coolant flow 284 through the second coolant passage enters the first section via the first coolant inlet, flows through the first section and around the first tube group, and exits the first section via a first coolant outlet 207 coupled to a first coolant outlet passage 208. By flowing gases through the first tube group and by flowing coolant through the first passage group (with the first passage group surrounding an exterior of the first tube group), a temperature of the gases flowing through the first tube group may be reduced. In order to increase a flow rate of coolant through the first section, the first passage group does not include fins coupling together the exterior surfaces of the first tube group.

The first section and the second section of the EGR cooler are both positioned within the housing of the EGR cooler, with the second section located downstream of the first section relative to a flow of gases through the EGR cooler. The second section includes a second plurality of tubes (e.g., second tube group 260) fluidly coupled to the coolant source. For example, the third coolant passage may be coupled to a second coolant inlet 246 of the second section of the EGR cooler, and a third coolant flow 286 may flow from the coolant source, into the second coolant inlet, through the second section, and out of a second coolant outlet 215 coupled to a second coolant outlet passage 216. The second tube group is positioned between (and coupled to each of) a third tube sheet 228 and a fourth tube sheet 244. The third tube sheet and fourth tube sheet may be fastened (e.g., rigidly secured) to the housing of the EGR cooler and positioned such that the second tube group is arranged perpendicular to the first tube group. In other words, a longest length of each tube of the second tube group is arranged parallel to the z-axis shown by the reference axes, while a longest length of each tube of the first tube group is arranged parallel to the x-axis shown by the reference axes. The second section also includes a second plurality of passages (e.g., second passage group 225) fluidly coupled to the first tube group and formed by exterior surfaces of the second tube group. The second passage group is adapted to flow gases (e.g., exhaust gas or an exhaust/intake air mixture) from the first tube group through the second section.

In this configuration, coolant flows through the second coolant inlet and into second tube group in a direction parallel to the z-axis shown by the reference axes. The second tube group is coupled to a plurality of internal coolant passages positioned within the housing of the EGR cooler and arranged perpendicular to the second tube group. The internal coolant passages direct coolant from each portion (e.g., section) of the second tube group to an adjacent portion (e.g., section) of the second tube group. In other words, a first portion 245 of the second tube group is fluidly coupled to a second portion 247 of the second tube group by a first internal coolant passage 224, the second portion of the second tube group is fluidly coupled to a third portion 249 of the second tube group by a second internal coolant passage 233, the third portion of the second tube group is fluidly coupled to a fourth portion 251 of the second tube group by a third internal coolant passage 231, and the fourth portion of the second tube group is fluidly coupled to a fifth portion 253 of the second tube group by a fourth internal coolant passage 235. Coolant flows through the first portion, to the first internal coolant passage, to the second portion, to the second internal coolant passage, to the third portion, to the third internal coolant passage, to the fourth portion, to the fourth internal coolant passage, and then through the fifth portion fluidly coupled to the second coolant outlet. While the embodiment shown by FIG. 2 shows the second section of the EGR cooler split into five portions with four internal coolant passages, alternate embodiments may include a different number of portions and/or internal coolant passages (such as three portions with two internal coolant passages, or the like)

In contrast to the first passage group of the first section, the second passage group includes a plurality of fins coupling together the exterior surfaces of tubes of the second tube group (e.g., coupled between adjacent tubes of the second tube group). For example a first fin group 248 couples together the first portion of the second tube group, a second fin group 250 couples together the second portion of the second tube group, a third fin group 256 couples together the third portion of the second tube group, a fourth fin group 220 couples together the fourth portion of the second tube group, and a fifth fin group 218 couples together the fifth portion of the second tube group. In the embodiment shown by FIG. 2, an amount of fins in each fin group progressively decreases from the first fin group to the fifth fin group (e.g., increases from the fifth fin group to the first fin group). In this way, a heat transfer area for heat transfer between the coolant flowing through the tubes of the second tube group and gases flowing through the second passage group increases as gases flow downstream within the EGR cooler. By reducing the fin density at the fifth portion of the second tube group, less degradation at the tube-tube sheet junction may occur due to thermal gradients (e.g., a thermal gradient at the tube-tube sheet junction may be reduced). The temperature of gases flowing through the EGR cooler decreases as the gases travel from the fifth portion to the first portion, and so the fin density may be increased from the fifth portion to the first portion without degrading the tube-tube sheet junctions. Additionally, by varying the fin density from portion to portion of the second tube group, the total pressure drop of the EGR cooler may be reduced. In alternate embodiments, each fin group may include a different amount and/or position of fins than the amounts and positions shown by FIG. 2. For example, in some embodiments, only the fifth fin group may have reduced fin density relative to the other fin groups and the other fin groups may have a same number of fins as one another.

The transition section is coupled between the first section and the second section and flows gases (e.g., exhaust gas or a mixture of exhaust and intake air) from the first tube group of the first section to the second passage group of the second section. In other words, the first tube group is fluidly coupled to the second passage group via the transition section. The transition section is positioned between the first section and the second section such that the first section is separated from the second section within the housing of the EGR cooler. By configuring the first section, second section, and transition section in this way, exhaust gas may flow through the first tube group, to the transition section, and through the second passage group, but coolant may not flow from the first section or second section into either of the first tube group or the second passage group. Additionally, coolant may not flow from either of the first section or the second section into the transition section.

As described above, exhaust gas or an exhaust/intake air mixture may flow through the EGR cooler, and the flow of coolant through the EGR cooler may reduce a temperature of the gases entering the EGR cooler. In a first example of gas flow through the EGR cooler, the orifice positioned within the intake passage may be an adjustable orifice (e.g., with an adjustable amount of opening) moved into a partially opened or fully opened position. The EGR valve positioned within the output passage may be in a partially or fully opened position, as described above. A first gas flow 272 (e.g., an exhaust flow or an exhaust/intake air mixture flow) may enter the exhaust inlet of the EGR cooler at a first temperature, and while the first gas flow travels through the first tube group and the second passage group, thermal energy of the first gas flow may be transferred to coolant flowing through the first passage group and second tube group of the EGR cooler. The first gas flow then exits the EGR cooler as a second gas flow 238 with a second temperature that is reduced relative to the first temperature. The second gas flow mixes with an intake air (e.g., fresh air) flow 232 to form a mixed intake air and EGR flow 240 which includes a portion of intake air and a portion of cooled exhaust gas. The mixed intake air and EGR flow then travels through the intake passage towards the engine (e.g., toward the intake manifold of the engine).

In a second example of gas flow through the EGR cooler, the EGR valve is in a partially or fully opened position. The orifice may have a fixed amount of opening (e.g., a non-adjustable amount of opening), or the orifice may be an adjustable orifice (as described above) moved into a partially opened position (e.g., with an amount of opening between fully opened and fully closed). In this configuration, a portion of the mixed intake air and EGR flow described above is directed away from the engine and into the bypass passage as a recirculated flow 280. The recirculated flow includes cooled intake air (e.g., intake air cooled by a charge air cooler, such as the charge air cooler 155 shown by FIG. 1), as well as cooled exhaust gas or a cooled exhaust gas/intake air mixture (e.g., cooled by the EGR cooler). In the example of the adjustable orifice, the controller may determine an amount of opening of the orifice based on a temperature of the exhaust flow, as described above. For example, if the temperature of the exhaust flow is above a threshold temperature, the controller may decrease an opening of the orifice to direct an increased amount of recirculated flow back towards the exhaust inlet of the EGR cooler in order to reduce the temperature of the exhaust flow. By adjusting the amount of recirculated flow in this way, the temperature of the exhaust flow may be decreased to reduce degradation of the first section of the EGR cooler due to thermal stress. In one example, thermal stress may include an expansion or contraction of the first tube group due to a difference in temperature between the first tube sheet, the first tube group, and the second tube sheet.

In another example of gas flow through the EGR cooler, the engine may be operating with a decreased engine torque demand (e.g., less than a threshold torque demand). In one example, the engine may be operating with torque demand below the threshold torque demand when the engine is operating in an idle condition. As a result, the temperature of the exhaust flow may be decreased relative to a condition in which the engine torque demand is above the threshold torque demand. The controller may then decrease an amount of opening of the EGR valve in order to reduce an amount of exhaust flow entering the EGR cooler (and therefore reduce an amount of cooling of the exhaust flow). An amount of the exhaust flow is then directed into the bypass passage as a bypass flow 273 due to an increase in resistance of the EGR cooler resulting from the decreased opening of the EGR valve. The bypass flow then flows through a sump 290 (e.g., an oil sump or reservoir), where an amount of engine oil contained within the bypass flow is deposited (e.g., removed from the bypass flow and contained within the sump). While the sump is shown coupled to the bypass passage by FIG. 2, in alternate embodiments the sump may be coupled to the intake passage and positioned either upstream of the orifice (e.g., in a first position 292) or downstream of the orifice (e.g., in a second position 296). By configuring the EGR cooler and passages in this way, during periods of low engine torque demand (e.g., during engine idling), an amount of engine oil entering the first section of the EGR cooler via the exhaust flow may be reduced, thereby reducing a degradation of the EGR cooler (e.g., reducing a fouling of the components of the first section due to the engine oil).

FIG. 2 additionally shows a first axis 204 positioned within the first section of the EGR cooler and intersecting the first tube group, and a second axis 212 positioned within the second section of the EGR cooler and intersecting the fifth portion of the second tube group. The cross-sectional views of the first section and second section shown by FIG. 3 and described below are with reference to the first axis and the second axis shown by FIG. 2, with the cross-section of the first section arranged along the first axis, and the cross-section of the second section arranged along the second axis.

Turning now to FIG. 3, a cross-sectional view of the first section 203 of the EGR cooler 200 (described above with reference to FIG. 2) and a cross-sectional view of the second section 205 of the EGR cooler are shown.

The first section includes the tubes of the first tube group 270 positioned in an arrangement with an approximately circular cross-section. In other words, the tubes of the first tube group are positioned relative to each other such that the first tube group has an approximately cylindrical shape. Each tube of the first tube group is coupled between the first tube sheet 202 and the second tube sheet 210 shown by FIG. 2, and the first tube sheet and second tube sheet may have an approximately parallelepiped shape (e.g., an approximately rectangular cross-section). The second section includes the tubes of the second tube group 260 positioned in an arrangement with an approximately rectangular cross-section. In other words, the tubes of the second tube group are positioned relative to each other such that the second tube group has an approximately parallelepiped shape. The first passage group 271 surrounds the exterior surfaces of the first tube group, as described above with reference to FIG. 2. The second coolant flow 284 enters the first passage group and flows around the first tube group.

The second section includes the second tube group positioned between the third tube sheet 228 and the fourth tube sheet 244 (shown by FIG. 2 and described above). The second passage group 225 surrounds the exterior surfaces of the second tube group and is adapted to flow gases (e.g., exhaust gas or an exhaust/intake air mixture) around the second tube group. The third coolant flow 286 flows within the second tube group and receives thermal energy transferred from the gases within the second passage group. The fifth fin group 218 couples each tube of the second tube group to each adjacent tube of the second tube group. In one example, the fins may increase a thermal conductivity of the second tube group in order to increase a cooling ability of the EGR cooler. For example, the fins may increase an amount of thermal energy transferred from gases flowing through the second passage group to the coolant flowing through the second tube group.

By arranging the tubes of the first tube group to have a circular cross-section (e.g., arranging the tubes such that the first tube group has a cylindrical shape) as shown by FIG. 3, a packaging space and weight of the EGR cooler may be reduced, which may increase a serviceability of the EGR cooler (e.g., an ease of maintenance of the EGR cooler may be increased, such as when the first section is removed from the EGR cooler for cleaning, as described above during the description of FIG. 2).

FIG. 4 shows a perspective view of the embodiment of the EGR cooler shown by FIG. 2 and described above with reference to FIG. 2. However, the EGR cooler is shown by FIG. 4 with a rectangular arrangement of the first section, rather than a cylindrical arrangement. In the view shown by FIG. 4, the housing of the EGR cooler has been omitted (e.g., not shown). The first section, second section, and transition section are shown separated from each other to illustrate direction of gas flow through each section, as well as a direction of coolant flow through each section. As described above, coolant and gas flow through the first section (e.g., with gas flowing through the first tube group and coolant flowing through the first passage group). Coolant and gas also flow through the second section (e.g., coolant flows through the second tube group while gas flows through the first passage group). However, coolant does not flow through the transition section. Only gas flows through the transition section, in a direction from the first section and to the second section. In other words, gas flows out of the second end of the first tube group, into the transition section, and into the second passage group.

FIG. 5 shows an internal view of a portion of the first section of the EGR cooler shown by FIG. 2 and FIG. 4, and described above. Components already introduced during the descriptions of FIG. 2 and FIG. 4 above may not be re-introduced during the description of FIG. 5 below.

The first tube sheet 202 and second tube sheet 210 are shown coupled to the first tube group 270, with coolant flowing around the first tube group and towards the first coolant outlet 207. The second tube sheet is shown separated (e.g., positioned away) from the housing of the EGR cooler by a seal 502 (e.g., a double o-ring seal). In other words, the seal is positioned between the housing and the second tube sheet, such that the housing does not directly contact the second tube sheet. A first space 514 is positioned between each tube of the first tube group and the second tube sheet. When the tubes of the first tube group are heated by gases (e.g., exhaust gas or an exhaust/intake air mixture) flowing through the first tube group, the tubes may expand due to an increasing temperature of the first tube sheet. The first space between each tube is configured such that coolant flowing through the first passage group does not permeate the first space, but a diameter of each tube of the first tube group may expand to fill the first space as the first tube group is heated.

In contrast to the second tube sheet, the first tube sheet is sealed along an exterior of the tube sheet (e.g., a side opposite to an interior of the first section) by a plate 508. The plate and the first tube sheet are fastened to the housing of the EGR cooler via a bolting apparatus 500 configured to fit within a channel 501 of the plate, first tube sheet, and housing. In one example, the bolting apparatus may have a threaded shank adapted to couple with a threaded surface of the channel. A second space 510 and a third space 512 are positioned between each tube of the first tube group and the first tube sheet. The second space is formed between an exterior of each tube of the first tube group and a first surface 534 of an extending portion 530 of the first tube sheet, with the extending portion protruding into the first passage group 271. The third space is formed by the exterior of each tube of the first tube group and a second surface 532 of the extending portion of the first tube sheet. The first surface is coupled to a third surface 538 angled relative to the first surface and extending away from the second space, while the second surface is coupled to a fourth surface 540 angled relative to the second surface and extending away from the third space. The third surface and the fourth surface couple together (e.g., intersect) between each tube and each adjacent tube (e.g., between each pair of tubes) of the first tube group. Coolant flowing through the first passage group is not able to flow out of the first tube sheet due to a seal provided by the plate coupled to the first tube sheet. By configuring the first tube sheet and the first tube group in this way, coolant may flow into the second space and the third space surrounding each tube of the first tube group in order to increase a cooling of the first tube sheet by the coolant. In other words, coolant may flow toward the first tube sheet in a first direction 504 into the second space, flow around the tubes of the first tube sheet, and flow away from the first tube sheet and out of the third space in a second direction 506. As the coolant contacts the surfaces of the first tube sheet adjacent to the second space and the third space, thermal energy may transfer away from the first tube sheet and into the coolant, thereby reducing a temperature of the first tube sheet and increasing a turbulence of the coolant. The increased turbulence of the coolant may increase a cooling ability of the coolant (e.g., by increasing an amount of mixing of higher temperature coolant with lower temperature coolant), thereby reducing an overall temperature of the first section. The reduced temperature of the first section may increase a durability of the first section (e.g., reduce an amount of degradation to the first section due to thermal stress as described above).

In the configuration described above, the second section (as described above) of the EGR cooler may receive a smaller amount of thermal stress than the removable first section. In other words, exhaust gases enter the first section at a first temperature, and the first section (specifically, coolant flowing through the first section) absorbs a first portion of thermal energy from the exhaust gases. The gases then exit the first section at a second temperature, with the second temperature being lower than the first temperature, and enter the second section of the EGR cooler via the transition section. In this way, the second section of the EGR cooler may utilize a configuration with a higher cooling efficiency (e.g., flowing exhaust gas around the second tube group and within the second passage group, and flowing coolant through the second tube group) than the first section of the EGR cooler. However, due to the decreased temperature of the gases entering the second section (due to the presence of the first section, the second section may experience a decreased amount of degradation. Additionally, by configuring the first section as described above, a durability of the first section may be increased so that the first section may more effectively absorb thermal energy from the exhaust gas with reduced component degradation.

FIG. 6 shows a view of an embodiment of a housing for the second section of the EGR cooler shown by FIG. 2 and described above. In this view, a first depression 600 and a second depression 602 of the housing of the EGR cooler are shown, with the first depression positioned along a first side 604 of the EGR cooler and the second depression positioned along a second side 606 of the EGR cooler, and the first side positioned opposite to the second side in a direction parallel to the y-axis of the reference axes. The housing also includes a plurality of rounded corners 608 positioned at locations where a top side 612 of the housing and a bottom side 610 of the housing are joined with the first side and second side. The rounded corners are formed by the first side, second side, top side, and bottom side. The housing of the EGR cooler may be comprised of a first portion and a second portion, with the first portion including portions the surfaces of the housing (e.g., the first surface, second surface, and top surface) arranged above the center axis 614 (e.g., surfaces positioned in a direction toward the top surface and away from the bottom surface, relative to the center axis), while a second portion includes the surfaces of the housing arranged below the center axis (e.g., surfaces positioned in a direction toward the bottom surface and away from the top surface, relative to the center axis). The first portion and the second portion of the housing may be fused together (e.g., welded) to increase a structural strength of the EGR cooler (e.g., a resistance to deformation of the housing). The first depression, second depression, and rounded corners may further increase the structural strength of the EGR cooler and increase an ability of the EGR cooler to expand in response to thermal expansion of the second tube group and/or the housing.

FIGS. 2-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. Further, elements shown intersecting one another may be referred to as intersecting elements or intersecting one another, in at least one example. Further still, an element shown within another element or shown outside of another element may be referred as such, in one example.

FIG. 7 depicts a method 700 for flowing exhaust gas, intake air, and coolant through an EGR cooler (such as the EGR coolers shown by FIGS. 2-6). Instructions for carrying out method 700 and the rest of the methods included herein may be executed by a controller (such as the controller 110 shown by FIG. 1) based on instructions stored on a memory of the controller and in conjunction with signals received from a control unit and sensors of the engine system, such as the sensors (e.g., temperature sensors, or the like) described above with reference to FIG. 1. The controller may employ engine actuators of the engine system (e.g., such as the pump 156 shown by FIG. 1, the EGR valve 234 shown by FIG. 2, or the like) to adjust engine operation, according to the methods described below.

In one example, the method includes flowing engine exhaust gas or an exhaust/intake air mixture through a first plurality of tubes (e.g., the first tube group shown by FIG. 2) of a first section of an EGR cooler, and flowing coolant through a first plurality of passages formed by exterior surfaces of the first plurality of tubes. The method also includes flowing exhaust gas through a second plurality of passages formed by exterior surfaces of a second plurality of tubes within a second section of the EGR cooler, and flowing coolant through the second plurality of tubes.

The method at 702 includes estimating and/or measuring engine operating conditions based on one or more outputs of various sensors in the engine system and/or operating conditions of the engine system (e.g., such as various temperature sensors, pressure sensors, or the like, as described above). Engine operating conditions may include engine speed and load, exhaust gas temperature (e.g., a temperature of exhaust gases exiting the engine following combustion), mass air flow rate, turbine speed, compressor inlet pressure, or the like. For example, estimating and/or measuring engine operating conditions based on exhaust temperature may include sensing the exhaust temperature through a sensor, or estimating/determining the exhaust temperature based on another condition, such as engine speed (as described above with reference to FIG. 2).

At 704, the controller (e.g., the engine controller described above) may determine whether the engine load (in one example, engine torque demand) is less than the threshold engine load. The controller may compare a measured value (e.g., by one or more sensors within the engine system) and/or estimated value of engine load to the threshold value for engine load. In one example, the threshold engine load may be an amount of load on the engine during engine idling conditions.

If engine load is less than or equal to the threshold engine load at 704, the method continues to 706 where the method includes flowing exhaust gas directly from the engine to an intake passage. For example, in order to flow exhaust gas directly to the intake passage, an amount of opening of an EGR valve coupled to an output passage of an EGR cooler (such as the EGR valve 234, output passage 236, and EGR cooler 200 described above with reference to FIG. 2) may be reduced by the controller. In other words, the controller may actuate an actuator (e.g., solenoid, or the like) coupled to the EGR valve in order to decrease an opening of the EGR valve. Engine exhaust gas may then be directed away from the EGR cooler and through a bypass passage (such as the bypass passage 278 shown by FIG. 2) towards the intake passage. By flowing exhaust gas directly from the engine to the intake passage when the engine load is below the threshold engine load, an amount of fouling and/or degradation of the EGR cooler may be reduced. For example, during conditions of low engine load (e.g., during engine idling), an amount of engine oil within the engine exhaust gas may be increased (e.g., engine oil exiting the engine may not combust due to low exhaust temperatures). The engine oil may enter the EGR cooler via an inlet of the EGR cooler and deposit on surfaces of the EGR cooler. By directing exhaust gas away from the EGR cooler, the engine oil within the exhaust gas may instead be deposited within a sump (e.g., the sump shown by FIG. 2) coupled to either the bypass passage or the intake passage, and an amount of engine oil deposited on surfaces of the EGR cooler may be decreased.

If the engine load is not less than the threshold engine load at 704, the method instead continues to 708 where the method includes mixing an amount of cooled intake air with the exhaust gas upstream of a first section of an EGR cooler. For example, an orifice (such as the orifice 294 shown by FIG. 2) may direct intake air from the intake passage to the bypass passage. The bypass passage is coupled to an exhaust passage, and the exhaust passage is coupled to an inlet of the EGR cooler. The intake air flowing towards the exhaust passage is at a first temperature, and the exhaust flowing through the exhaust passage is at a second temperature, with the second temperature being greater than the first temperature. The intake air then mixes with the exhaust gas within the exhaust passage to reduce the temperature of the exhaust gas. In a second example, the orifice may be an adjustable orifice (e.g., an actively controlled orifice or valve) and the controller may decrease an amount of opening of the orifice by sending a signal to an actuator of the orifice (e.g., a solenoid). By decreasing the amount of opening of the orifice, an amount of intake air directed to the bypass passage (and therefore, the exhaust passage) may be increased.

The method continues to 710 where the method includes determining whether an adjustment to EGR gas flow is requested. In one example, the controller may request an adjustment to EGR gas flow to increase an amount of intake air flowing to the inlet of the EGR cooler (e.g., to decrease the temperature of exhaust gas entering the EGR cooler). In another example, the controller may request an adjustment to EGR gas flow to increase an amount of exhaust gas flowing to the inlet of the EGR cooler (e.g., to increase an amount of cooled EGR gas output by the EGR cooler). By increasing or decreasing the flow of intake air to the EGR cooler and/or increasing or decreasing the flow of exhaust gas to the EGR cooler, the flow of EGR gas (e.g., cooled, mixed gas) from an outlet of the EGR cooler is adjusted.

If an adjustment to EGR gas flow is not requested at 710, the method continues to 712 where the method includes maintaining a ratio of exhaust gas to intake air of the mixture flowing into the first section of the EGR cooler at a relatively constant ratio. For example, the ratio of exhaust gas to intake air may be an amount of gases flowing from the engine exhaust (e.g., through the exhaust passage, or through the bypass passage from the outlet of the EGR cooler) to the inlet of the EGR cooler, compared to an amount of cooled intake air flowing to the inlet of the EGR cooler from the intake passage positioned upstream of the engine. In one example, during conditions in which engine load is approximately constant, the controller may not adjust an amount of opening of the EGR valve and the orifice in order to maintain the ratio of exhaust gas to intake air flowing towards the inlet of the EGR cooler. In another example, during conditions in which engine load is not constant (e.g., varies with time), the controller may adjust the amount of opening of the EGR valve and/or the orifice in response to measured and/or estimated engine load, exhaust gas flow, or the like, in order to maintain the ratio of exhaust gas to intake air flowing into the EGR cooler at an approximately constant ratio.

However, if an adjustment to EGR gas flow is requested at 710, the method instead continues to 714 where the method includes adjusting a ratio of exhaust gas to intake air of the mixture flowing into the first section of the EGR cooler. For example, as described above, the ratio of exhaust gas to intake air may be adjusted by increasing the flow of exhaust gas and/or intake air to the EGR cooler, decreasing the flow of exhaust gas and/or intake air to the EGR cooler, or separately increasing one flow (e.g., exhaust gas and/or intake air flow) and decreasing the other flow. As one example, the controller may increase the amount of intake air flow to the EGR cooler in order to reduce the temperature of exhaust gas entering the EGR cooler. By reducing the temperature of exhaust gas entering the cooler, degradation of the EGR cooler may be decreased (e.g., by reducing an amount of thermal stress on the EGR cooler due to thermal expansion of its components). As another example, the controller may increase an amount of exhaust gas flow to the EGR cooler in order to increase an amount of cooled exhaust gas (e.g., EGR gas) output by the EGR cooler. By increasing the amount of EGR gas output by the EGR cooler, noxious emissions by the engine may be reduced (as described above with reference to FIG. 1).

If the ratio of exhaust gas to intake air of the mixture flowing into the first section of the EGR cooler is adjusted at 714, or if the ratio of exhaust gas to intake air of the mixture flowing into the first section of the EGR cooler is not adjusted at 714, the method continues to 716 where the method includes flowing gases from upstream of the EGR cooler through a first plurality of cooling tubes of the first section of the EGR cooler and flowing coolant around the first plurality of cooling tubes. As described above, the EGR cooler may reduce the temperature of gases (e.g., exhaust gas or an exhaust gas/intake air mixture) flowing into the inlet of the EGR cooler. The gases flow into the first plurality of cooling tubes (e.g., the first tube group described above with reference to FIG. 2) while coolant flows around the first plurality of cooling tubes. Thermal energy transfers from the gases flowing through the tubes, to the coolant flowing around the tubes. In this way, the temperature of the gases is reduced.

The method then continues to 718 where the method includes flowing coolant through a second plurality of cooling tubes of a second section of the EGR cooler and flowing gases from the first section around the second plurality of cooling tubes. For example, as described above with reference to FIGS. 2-6, the gases flowing through the first plurality of tubes flow into a transition section of the EGR cooler, with the transition section coupled between the first section and the second section. The gases then flow into the second section and around the second plurality of cooling tubes (e.g., the second tube group described above with reference to FIG. 2), while coolant flows within the second plurality of cooling tubes. Additional thermal energy from the gases is transferred to the coolant, thereby further reducing the temperature of the gases.

The method then continues to 720 where the method includes flowing gases from the second section to an intake passage, and adjusting the amount of gases flowing to the intake passage from the EGR cooler via the EGR valve disposed in the output passage coupled between the outlet of the EGR cooler and the intake passage. The outlet is coupled to the second section of the EGR cooler and is additionally coupled to the output passage. A flow rate of gases from the EGR cooler may be adjusted by adjusting an amount of opening of the EGR valve. For example, the controller may send a signal to an actuator coupled to the EGR valve in order to decrease the amount of opening of the EGR valve and reduce the flow rate of gases from the EGR cooler (e.g., to reduce an amount of EGR gas flowing towards the engine). The controller may also increase the amount of opening of the EGR valve to increase the flow rate of gases from the EGR cooler (e.g., to reduce noxious emissions as described above).

The technical effect of flowing exhaust gas and/or an exhaust gas/intake air mixture through the first plurality of tubes of the first section of the EGR cooler and around the second plurality of tubes of the second section of the EGR cooler is to reduce the temperature of gases flowing through the second section of the EGR cooler and reduce degradation of the entire EGR cooler due to high thermal gradients. The controller may adjust the ratio of exhaust gas to intake air upstream of the EGR cooler to adjust the temperature of the exhaust gas and/or adjust the amount of EGR gases directed towards the engine. Gases are directed from the first plurality of tubes of the first section, into a transition section, and around the second plurality of tubes of the second section, while coolant is directed around the first plurality of tubes, and additionally directed through the second plurality of tubes.

By flowing gases and coolant through the EGR cooler in this way, the first section of the EGR cooler may reduce the temperature of the gases by a first amount while the second section of the EGR cooler reduces the temperature of the gases by a second amount. Reducing the temperature of the gases by the first amount via the first section may decrease an amount of thermal stress on the second section due to a reduced amount of thermal expansion of the second plurality of tubes. A packaging size of the second section may therefore be increased relative to the first section, and the increased size may increase a cooling power of the EGR cooler. Additionally, by flowing coolant around the first plurality of tubes and flowing gases within the first plurality of tubes, a durability of the first section may be increased. For example, coolant may flow within spaces between each tube of the first plurality of tubes and come into contact with a first tube sheet and a second tube sheet, with the first tube sheet positioned at a first end of the first plurality of tubes and the second tube sheet positioned at a second end of the first plurality of tubes. The coolant may reduce a temperature of the first tube sheet and the second tube sheet, thereby reducing a difference in temperature between each tube sheet and the first plurality of tubes, and decreasing an amount of thermal stress on the first section due to the difference in temperatures. The first section may also be removable from the EGR cooler in order to increase an ease of maintenance of the EGR cooler, thereby decreasing a likelihood of engine oil accumulation within the EGR cooler. Overall, EGR cooler durability is increased, and degradation due to exhaust gas temperature and engine oil contamination is decreased.

In an embodiment, an exhaust gas recirculation (EGR) cooler includes a first section including a first plurality of tubes adapted to flow at least some exhaust gas, and a first plurality of passages formed by exterior surfaces of the first plurality of tubes and adapted to flow coolant from a coolant source. The EGR cooler additionally includes a second section including a second plurality of tubes adapted to flow coolant from the coolant source, and a second plurality of passages formed by exterior surfaces of the second plurality of tubes and adapted to flow the exhaust gas from the first plurality of tubes.

In one example of the EGR cooler, the second section is arranged downstream of the first section within a housing of the EGR cooler. In a second example of the EGR cooler, the first section and second section are separated from one another within the housing and wherein the first section is removably coupled to the housing. In a third example of the EGR cooler, a first end of each of the first plurality of tubes are rolled into a first tube sheet and a second end of each of the first plurality of tubes are rolled in a second tube sheet, wherein the first tube sheet is fastened to the housing, and wherein the second tube sheet is floating and not fastened to the housing. In a fourth example of the EGR cooler, the first section has a circular cross-section and the second section has a relatively rectangular cross-section (meaning more rectangular in cross-section than the first section). In a fifth example of the EGR cooler, the first plurality of tubes are fluidly coupled to the second plurality of passages via a transition section coupled between the first section and second section. In a sixth example of the EGR cooler, the second section includes a plurality of fins disposed within the second plurality of passages and coupled between adjacent tubes of the second plurality of tubes. In a seventh example of the EGR cooler, the first plurality of passages of the first section do not include any fins disposed therein.

As another embodiment, a method for an EGR system includes flowing exhaust gas from an engine through a first plurality of cooling tubes of a first section of an EGR cooler, and flowing coolant around the first plurality of cooling tubes. The method additionally includes flowing coolant through a second plurality of cooling tubes of a second section of the EGR cooler, and flowing exhaust gas from the first section around the second plurality of cooling tubes, with the second section arranged downstream from the first section.

In one example of the method, the method includes mixing a portion of cooled intake air with the exhaust gas upstream of the first section and then flowing the mixture through the first section of the EGR cooler and then the second section of the EGR cooler. In a second example of the method, the method includes adjusting a ratio of exhaust gas to intake air of the mixture flowing into the first section of the EGR cooler based on one or more engine operating conditions including engine load, a temperature of the intake air, a temperature of the exhaust gas, and a cooling effectiveness of the first section. In a third example of the method, the method includes maintaining a ratio of exhaust gas to intake air of the mixture flowing into the first section of the EGR cooler at a relatively constant ratio via a passive orifice arranged in one or more of a bypass passage coupled between an intake passage and an inlet of the first section of the EGR cooler or the intake passage, downstream of where the bypass passage couples to the intake passage. In a fourth example of the method, the method includes bypassing the EGR cooler and flowing exhaust gas directly from the engine to an intake passage during a condition where engine load is below a threshold load. In a fifth example of the method, the method includes flowing exhaust gas from the second section to an intake passage and adjusting an amount of the exhaust gas flowing to the intake passage via an EGR valve disposed in a passage coupled between an outlet of the second section and the intake passage.

As yet another embodiment, an EGR system includes a coolant source and an EGR cooler. The EGR cooler includes an inlet fluidly coupled to each of an intake passage and exhaust passage. The EGR cooler also includes a first section including a first plurality of tubes, with the first plurality of tubes fluidly coupled to the inlet and adapted to flow a mixture of exhaust gas and intake air, and a first plurality of passages formed by exterior surfaces of the first plurality of tubes and fluidly coupled to the coolant source. The EGR cooler additionally includes a second section including a second plurality of tubes fluidly coupled to the coolant source and a second plurality of passages formed by exterior surfaces of the second plurality of tubes, with the second plurality of passages fluidly coupled to the first plurality of tubes and adapted to flow the mixture of exhaust gas and intake air.

In a first example of the EGR system, a bypass passage is coupled between the exhaust passage, at a position along the exhaust passage upstream of the inlet of the EGR cooler, and the intake passage. In a second example of the EGR system, an orifice is disposed in one of the bypass passage or the intake passage, downstream in the intake passage from where the bypass passage couples to the intake passage. In a third example of the EGR system, the orifice is an actively adjustable orifice, and the EGR system includes a controller including memory with instructions stored thereon for adjusting an amount of opening of the orifice based on one or more engine operating conditions. In a fourth example of the EGR system, the EGR cooler additionally includes a transition section coupled between the first section and the second section and wherein the first plurality of tubes are fluidly coupled to the second plurality of passages via the transition section. In a fifth example of the EGR system, an EGR valve is disposed in a passage coupled between an outlet of the EGR cooler and the intake passage.

In another representation, an exhaust gas recirculation (EGR) cooler comprises a first section including a first plurality of tubes with gas in an inside of the first plurality of tubes and coolant on an outside of the first plurality of tubes and a second section including a second plurality of tubes with coolant on an inside of the second plurality of tubes and gas on an outside of the second plurality of tubes, where the same gas on the inside of the first plurality of tubes in on the outside of the second plurality of tubes and a same coolant source provides the coolant on the outside of the first plurality of tubes and coolant on the inside of the second plurality of tubes. As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," or the like are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An exhaust gas recirculation (EGR) cooler, comprising:
a first section including a first plurality of tubes adapted to flow at least some exhaust gas and a first plurality of passages formed by exterior surfaces of the first plurality of tubes and adapted to flow coolant from a coolant source, the first plurality of tubes arranged between and coupled to each of a first tube sheet and a second tube sheet, the first tube sheet rigidly fastened to a housing of the EGR cooler and the second tube sheet floating and not fastened to the housing, the second tube sheet arranged downstream of the first tube sheet with respect to exhaust gas flow through the first section; and
a second section including a second plurality of tubes adapted to flow coolant from the coolant source and a second plurality of passages formed by exterior surfaces of the second plurality of tubes and adapted to flow the exhaust gas from the first plurality of tubes, the second plurality of tubes arranged between and coupled to each of a third tube sheet and a fourth tube sheet, the third tube sheet and the fourth tube sheet each rigidly fastened to the housing, where the housing surrounds the first section and the second section.

2. The EGR cooler of claim 1, wherein the second section is arranged downstream of the first section within the housing of the EGR cooler, with respect to exhaust gas flow through the EGR cooler, and wherein the first plurality of tubes and the second plurality of tubes are cylindrical tubes.

3. The EGR cooler of claim 2, wherein the first section and the second section are separated from one another within the housing via a transition section coupled between and to each of the first section and the second section and positioned within the housing and wherein both the first section and the second section are removably coupled to the housing.

4. The EGR cooler of claim 2, wherein a first end of each of the first plurality of tubes are rolled into the first tube sheet and a second end of each of the first plurality of tubes are rolled in the second tube sheet, and wherein the first tube sheet and the second tube sheet are each arranged perpendicular to each of the third tube sheet and the fourth tube sheet within the housing.

5. The EGR cooler of claim 1, wherein the first section has a circular cross-section and the second section has a relatively rectangular cross-section, wherein the first tube sheet is sealed along an exterior of the first tube sheet by a plate, the plate and first tube sheet fastened to the housing, wherein a first space is positioned between each tube of the first plurality of tubes and extending portions of the first tube sheet, on either side of the extending portions, where one extending portion of the extending portions extends into each tube, and wherein the first space between each tube and the extending portions is adapted to receive a portion of the coolant flowing through the first plurality of passages.

6. The EGR cooler of claim 5, wherein the first plurality of tubes are fluidly coupled to the second plurality of passages via a transition section coupled between the first section and the second section, the transition section included within the housing, and wherein a second space is positioned between each tube of the first plurality of tubes and the second tube sheet, the second space configured to be filled by expanded tubes of the first plurality of tubes when exhaust gas is flowing through the first plurality of tubes and the first plurality of tubes are heated by the flowing exhaust gas.

7. The EGR cooler of claim 1, wherein the second section includes a plurality of fins disposed within the second plurality of passages and coupled between adjacent tubes of the second plurality of tubes, wherein the plurality of fins is arranged into a plurality of fin groups from an upstream end to a downstream end of the second section, where the upstream end and the downstream end are relative to the flow of exhaust gas through the second section, and wherein an amount of fins within each fin group of the plurality of fin groups progressively increases from a first fin group arranged at the upstream end to a last fin group arranged at the downstream end.

8. The EGR cooler of claim 1, wherein the first plurality of passages of the first section do not include any fins disposed therein, wherein a first coolant inlet of the first section and a second coolant inlet of the second section are each coupled to the coolant source so that coolant from the coolant source flows in parallel through each of the first section and the second section, and wherein the second plurality of tubes is split into a plurality of sections of tubes, where coolant flows in series through the plurality of sections, from one section of tubes to an adjacent section of tubes, from the second coolant inlet to a coolant outlet of the second section, the coolant outlet and the second coolant inlet arranged at opposite ends of the second section, the opposite ends relative to exhaust flow through the second section.

9. A method for an exhaust gas recirculation (EGR) system, comprising:
flowing exhaust gas from an engine through a first plurality of cooling tubes of a first section of an EGR cooler and flowing coolant around the first plurality of cooling tubes;
flowing coolant through a second plurality of cooling tubes of a second section of the EGR cooler and flowing exhaust gas from the first section around the second plurality of cooling tubes, wherein the second section is arranged downstream from the first section with respect to a direction of exhaust gas flow through the EGR system;
in response to engine load being at or greater than a threshold load, flowing a portion of cooled engine intake air, cooled via a charge air cooler arranged in an intake passage of an engine, through a bypass passage, mixing the portion of cooled engine intake air with the exhaust gas upstream of the first section, and then flowing the mixture through the first section of the EGR cooler and then the second section of the EGR cooler; and
in response to engine load being less than the threshold load, decreasing an opening of an EGR valve positioned downstream of the second section and bypassing the EGR cooler and flowing exhaust gas directly from the engine to the intake passage via the bypass passage.

10. The method of claim 9, further comprising, during bypassing the EGR cooler, flowing the exhaust gas through an oil sump arranged in the bypass passage and removing oil from the exhaust gas prior to flowing the exhaust gas to the engine.

11. The method of claim 9, further comprising adjusting a ratio of exhaust gas to engine intake air of the mixture flowing into the first section of the EGR cooler based on one or more engine operating conditions including engine load, a temperature of the engine intake air, a temperature of the exhaust gas, or a cooling effectiveness of the first section.

12. The method of claim 9, further comprising maintaining a ratio of exhaust gas to engine intake air of the mixture flowing into the first section of the EGR cooler at a relatively constant ratio via a passive orifice arranged in one or more of the bypass passage, the bypass passage coupled between the intake passage and an inlet of the first section of the EGR cooler, or the intake passage, downstream of where the bypass passage couples to the intake passage.

13. The method of claim 9, further comprising flowing coolant in parallel through the first section and the second section from a same coolant source and wherein flowing coolant through the second section further includes flowing coolant in series through a plurality of sections of the second plurality of cooling tubes, from an exhaust gas outlet end of the second section to an exhaust gas inlet end of the second section.

14. The method of claim 9, further comprising flowing exhaust gas from the second section to the intake passage and adjusting an amount of the exhaust gas flowing to the intake passage via the EGR valve, the EGR valve disposed in a passage coupled between an outlet of the second section and the intake passage.

15. An exhaust gas recirculation (EGR) system, comprising:
a coolant source; and
an EGR cooler, comprising:
an inlet fluidly coupled to each of an intake passage of an engine and an exhaust passage of the engine;
a first section including a first plurality of tubes, the first plurality of tubes fluidly coupled to the inlet and adapted to flow a mixture of exhaust gas and intake air, and a first plurality of passages formed by exterior surfaces of the first plurality of tubes and fluidly coupled to the coolant source via a first coolant inlet; and
a second section including a second plurality of tubes fluidly coupled to the coolant source via a second coolant inlet and a second plurality of passages formed by exterior surfaces of the second plurality of tubes, the second plurality of passages fluidly coupled to the first plurality of tubes and adapted to flow the mixture of exhaust gas and intake air, where the second plurality of tubes is divided into a plurality of sections of tubes, where tubes of each section of the plurality of sections are fluidly coupled to tubes of an adjacent section of the plurality of sections via a coolant passage of a plurality of coolant passages within the EGR cooler, and where coolant flows from the second coolant inlet, arranged at a gas outlet end of the second section, in series through each section of the plurality of sections, to a coolant outlet arranged at a gas inlet end of the second section, the plurality of coolant passages arranged in parallel with the second plurality of tubes.

16. The EGR system of claim 15, further comprising a bypass passage coupled between the exhaust passage, at a position along the exhaust passage upstream of the inlet of the EGR cooler, and the intake passage, wherein coolant from the coolant source flows in parallel to the first coolant inlet and the second coolant inlet, and wherein the second section includes a plurality of fins disposed within the second plurality of passages and coupled between adjacent tubes of the second plurality of tubes, wherein the plurality of fins is arranged into a plurality of fin groups from the gas inlet end to the gas outlet end of the second section, and wherein an amount of fins within each fin group of the plurality of fin groups progressively increases from a first fin group arranged at the gas inlet end of the second section to a last fin group arranged at the gas outlet end of the second section.

17. The EGR system of claim 16, further comprising an orifice disposed in one of the bypass passage or the intake passage, downstream in the intake passage from where the bypass passage couples to the intake passage and further comprising an oil sump arranged in the bypass passage.

18. The EGR system of claim 17, wherein the orifice is an actively adjustable orifice and further comprising a controller including memory with instructions stored thereon for adjusting an amount of opening of the orifice based on one or more engine operating conditions of the engine.

19. The EGR system of claim 15, wherein the first section and the second section are positioned within a same housing of the EGR cooler, wherein the EGR cooler further comprises a transition section included within the housing and coupled between and to each of the first section and the second section wherein the first plurality of tubes is fluidly coupled to the second plurality of passages via the transition section, and wherein the first plurality of tubes and the second plurality of tubes are cylindrical tubes.

20. The EGR system of claim 19, further comprising an EGR valve disposed in a passage coupled between an outlet of the EGR cooler and the intake passage, wherein an inlet end of each tube of the first plurality of tubes is coupled to a first tube sheet and an outlet end of each tube of the first plurality of tubes is coupled to a second tube sheet, and wherein an inlet end of each tube of the second plurality of tubes is coupled to a third tube sheet and an outlet end of each tube of the second plurality of tubes is coupled to a fourth tube sheet, where each of the first, third, and fourth tube sheets are fixed to the housing and the second tube sheet is floating and not fixed to the housing, and where the first and second tube sheets are arranged perpendicular to each of the third and fourth tube sheets.

* * * * *